May 30, 1944. J. W. GILES ET AL 2,350,225
METHOD OF AND APPARATUS FOR MAKING BUNCHES
Filed Dec. 28, 1940 15 Sheets-Sheet 7
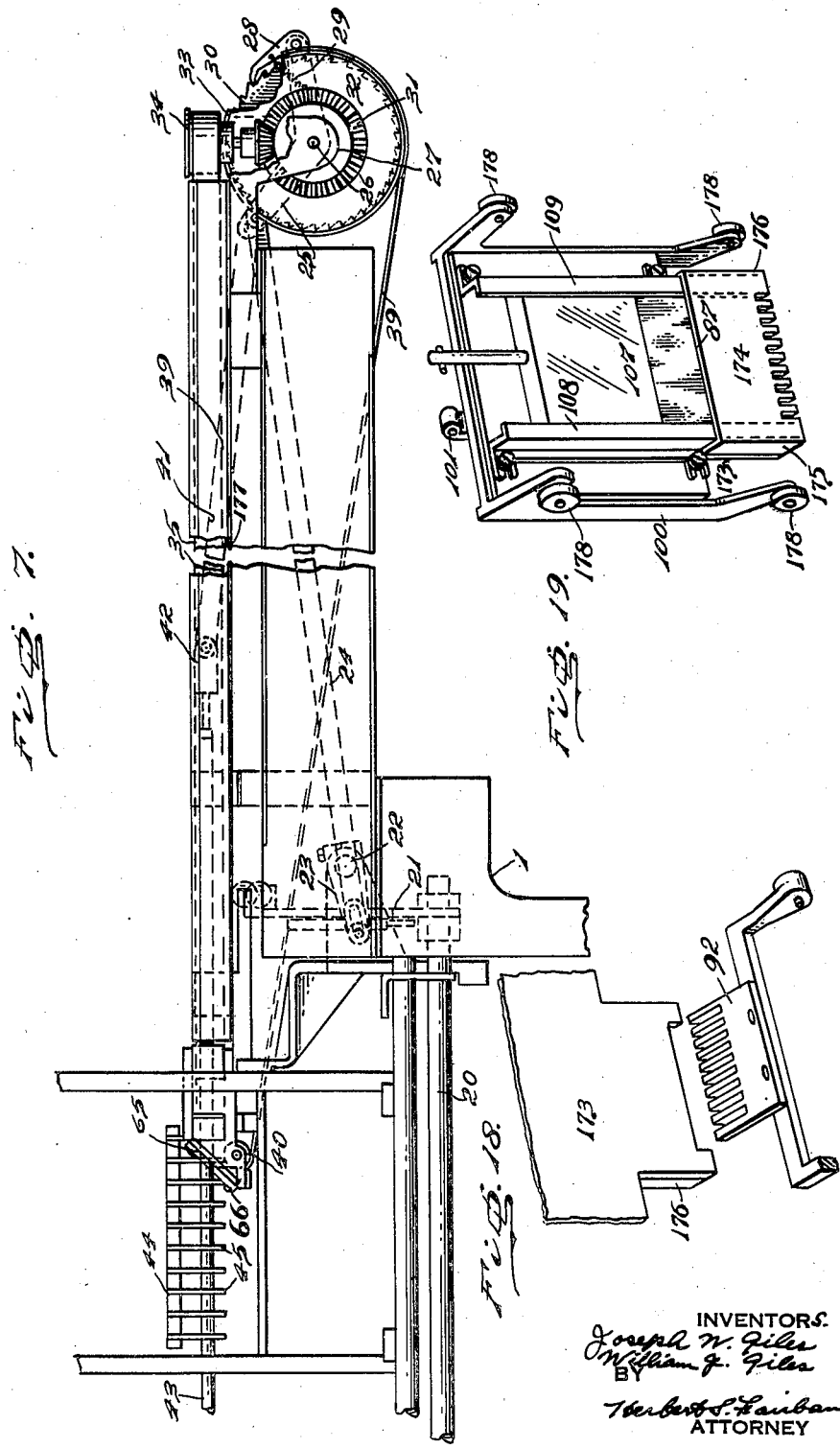
INVENTORS:
Joseph W. Giles
William J. Giles
BY
Herbert S. Fairbanks
ATTORNEY

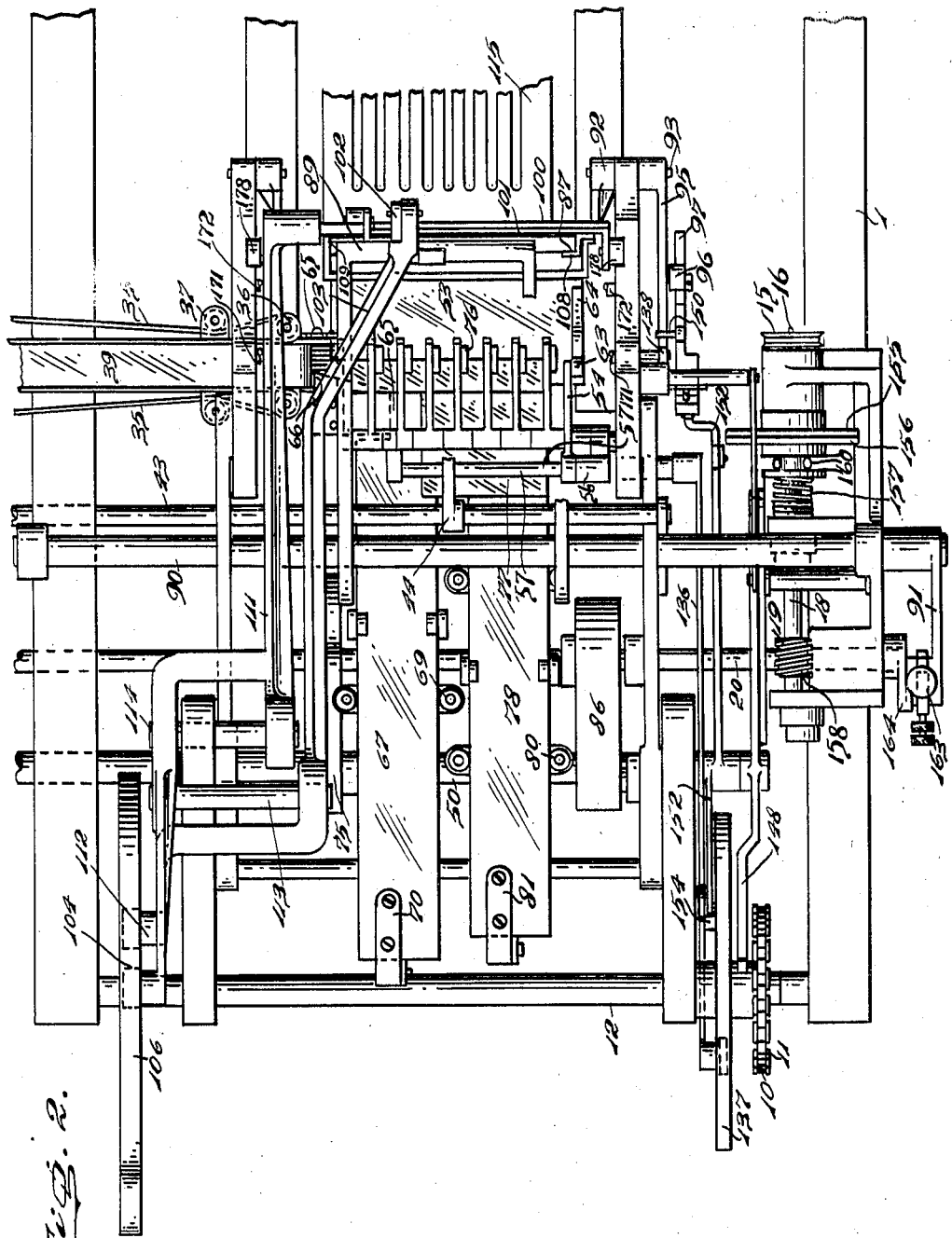

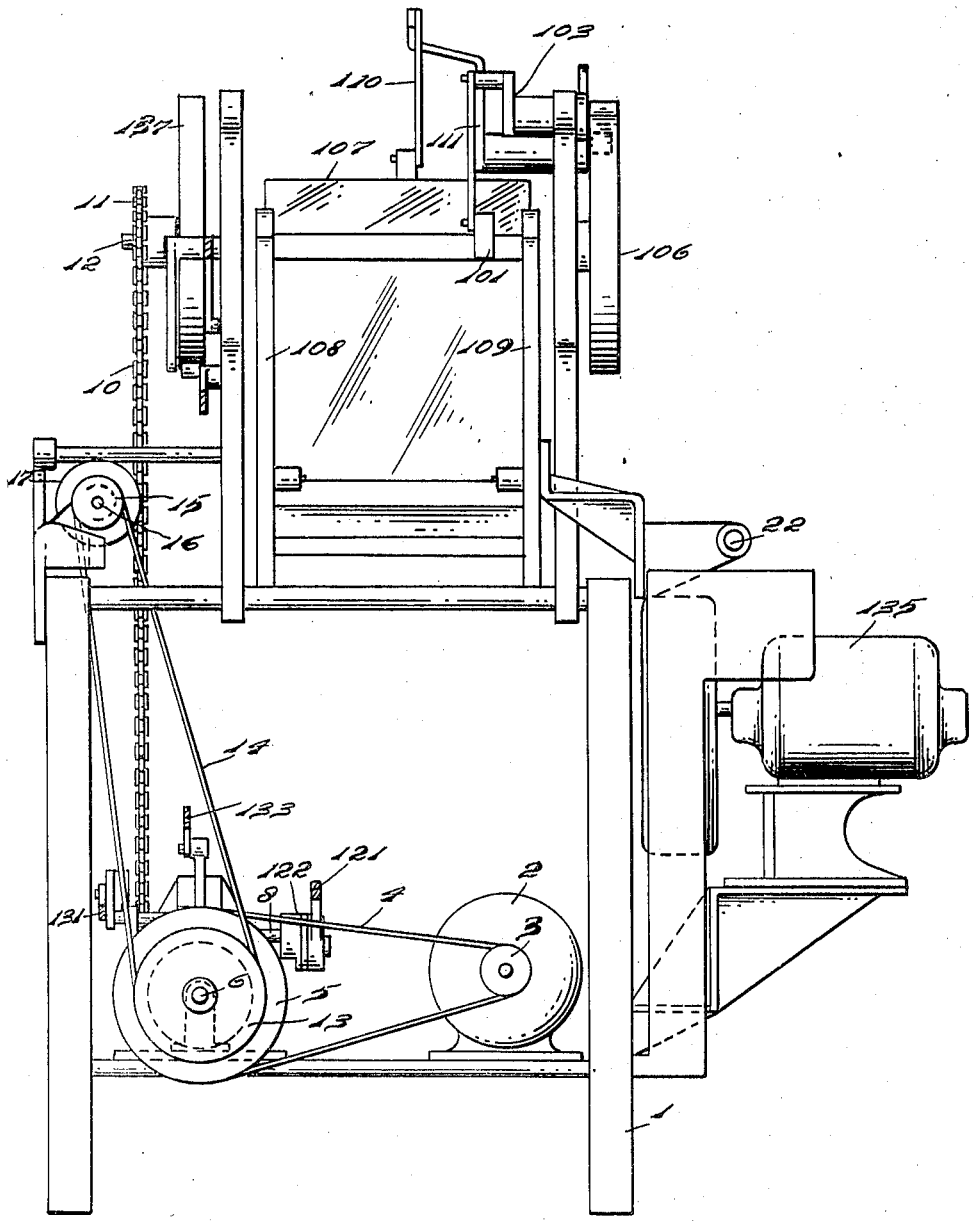

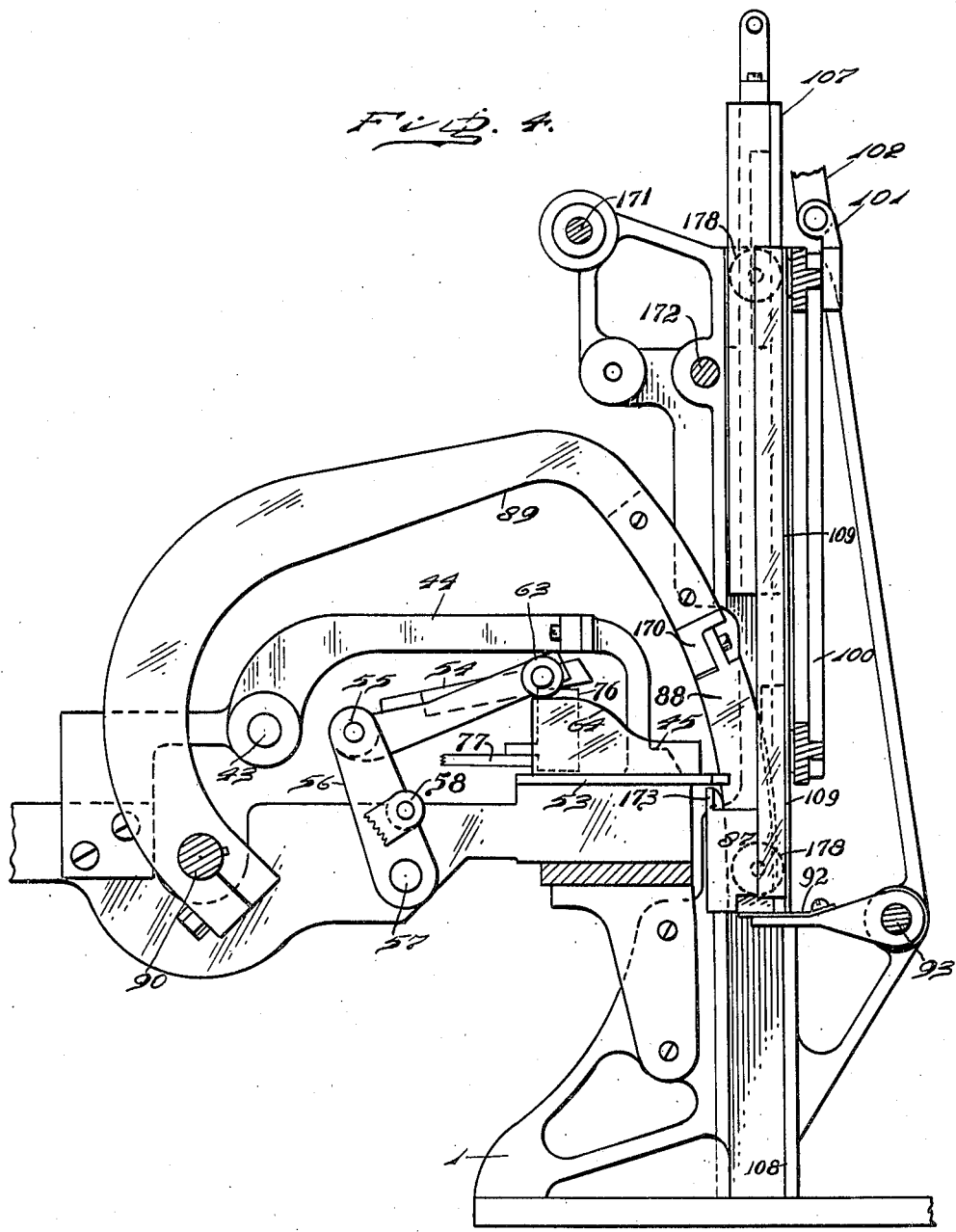

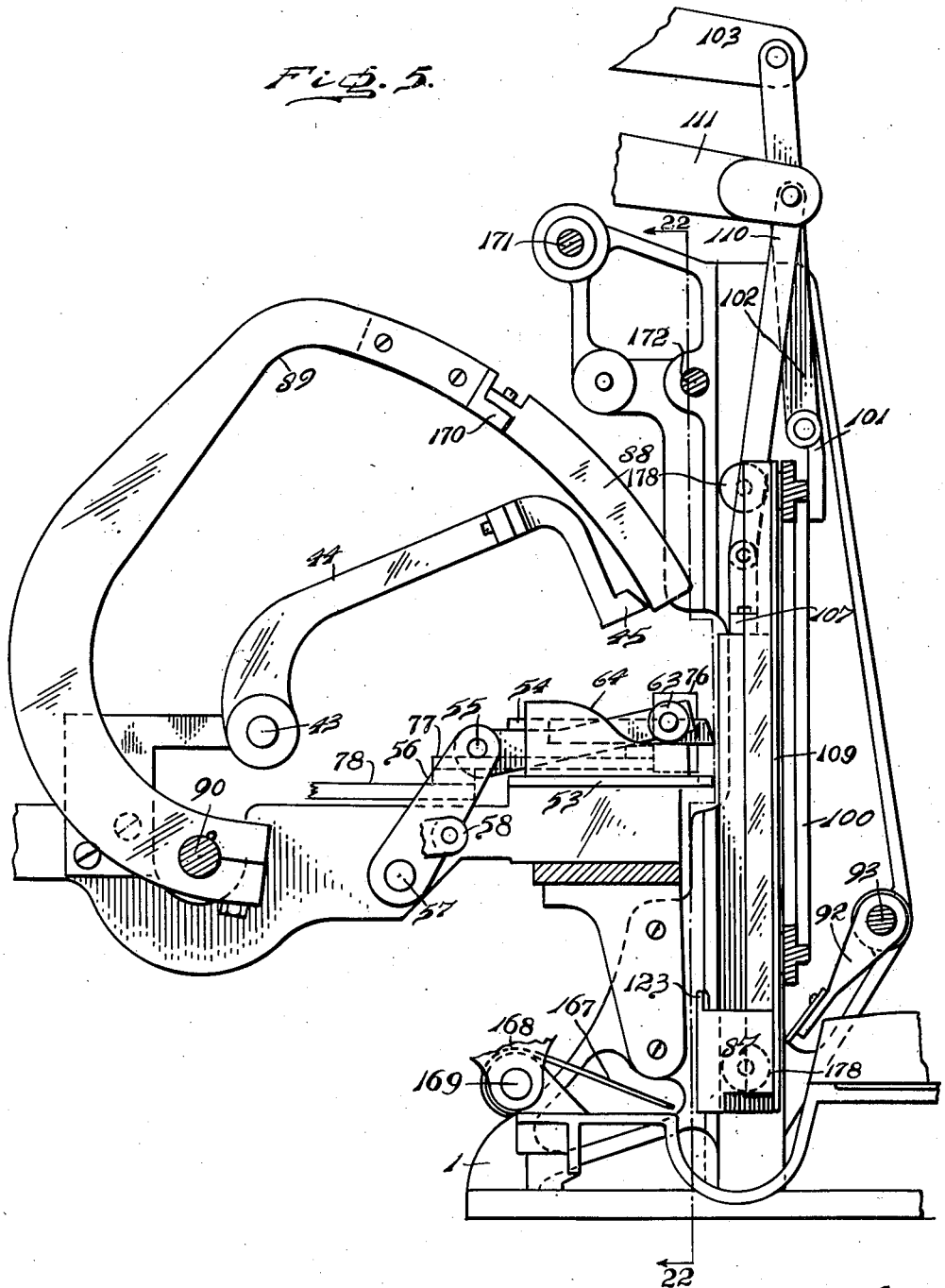

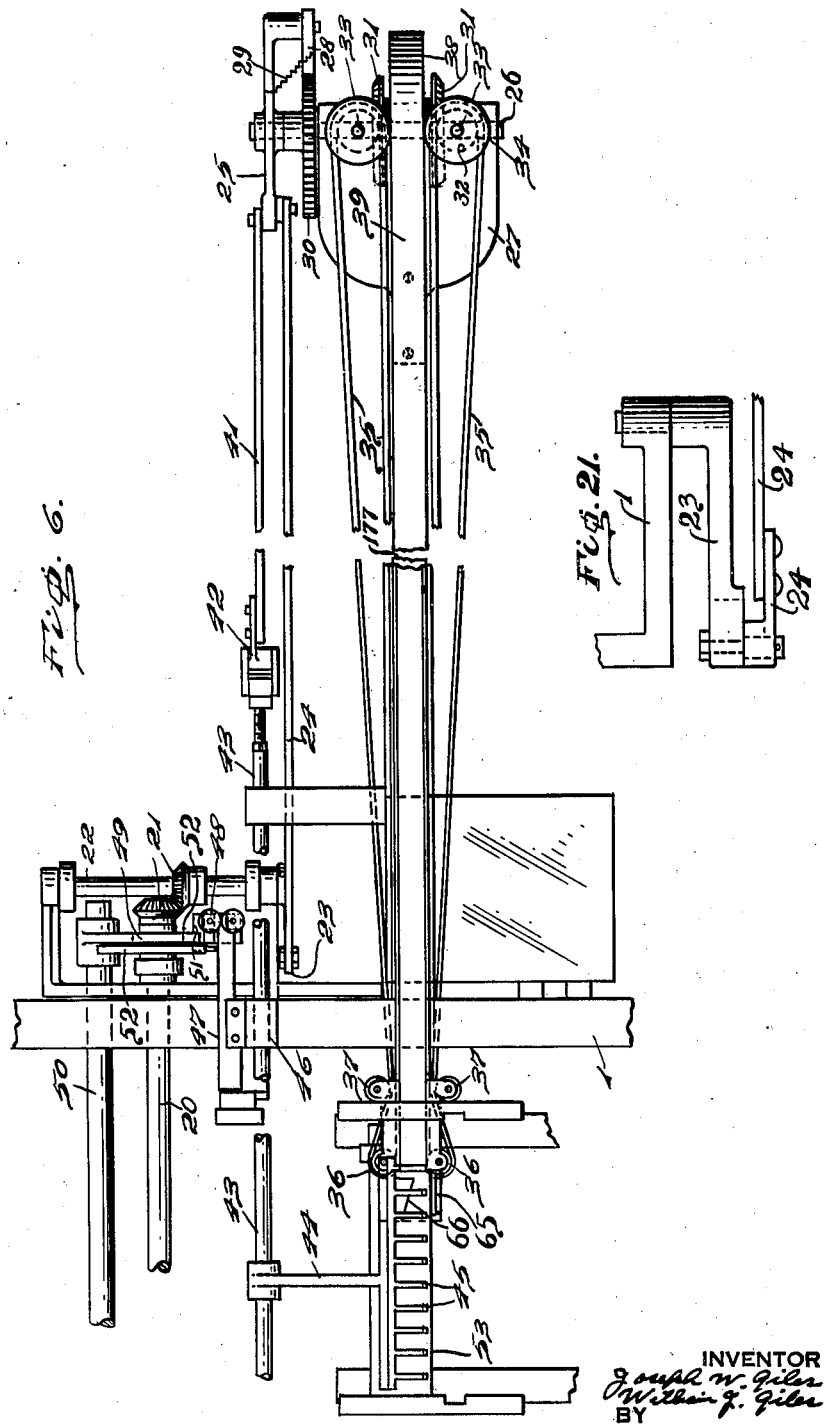

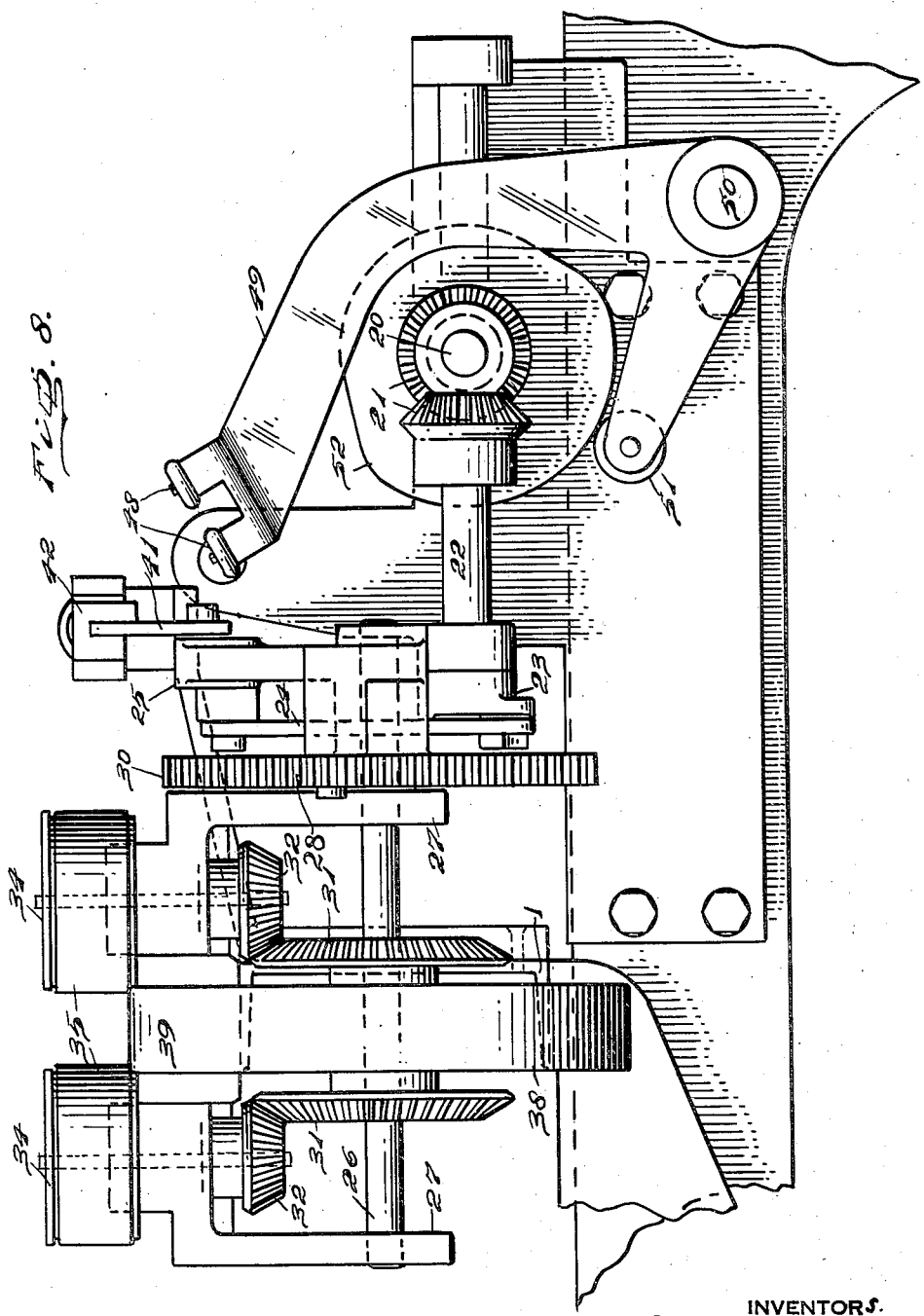

May 30, 1944.  J. W. GILES ET AL  2,350,225
METHOD OF AND APPARATUS FOR MAKING BUNCHES
Filed Dec. 28, 1940  15 Sheets-Sheet 9
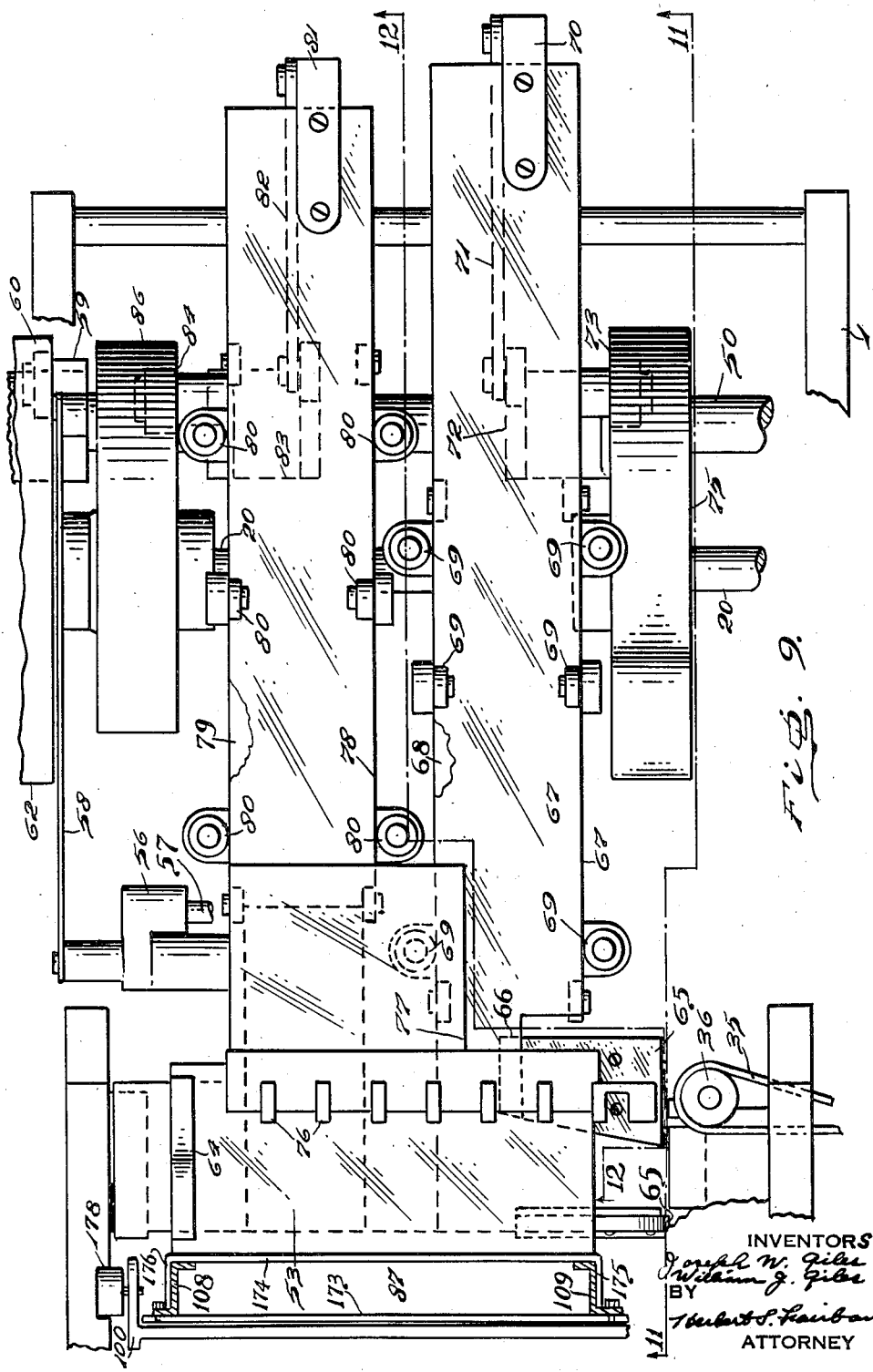
INVENTORS.
Joseph W. Giles
William J. Giles
BY
Herbert S. Fairbanks
ATTORNEY

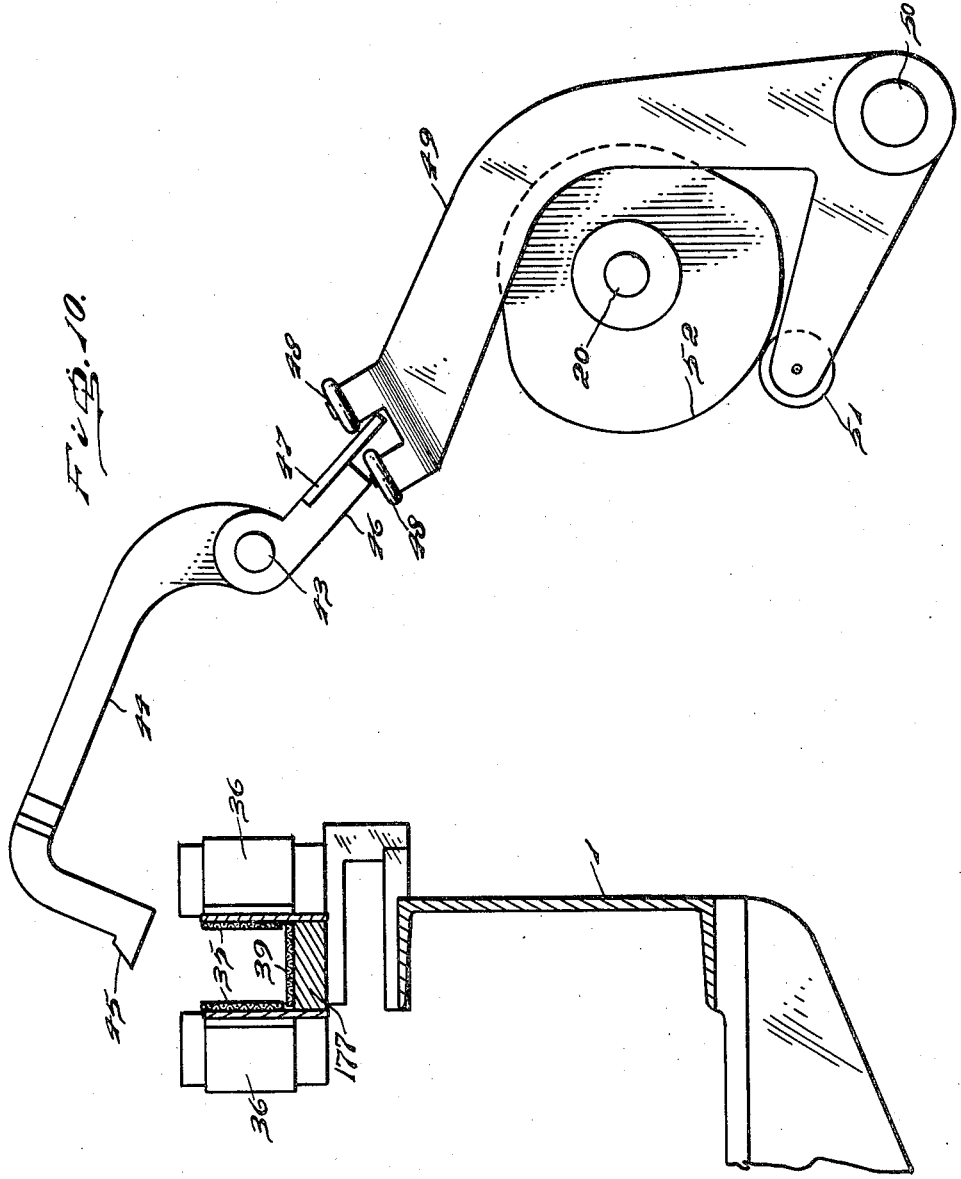

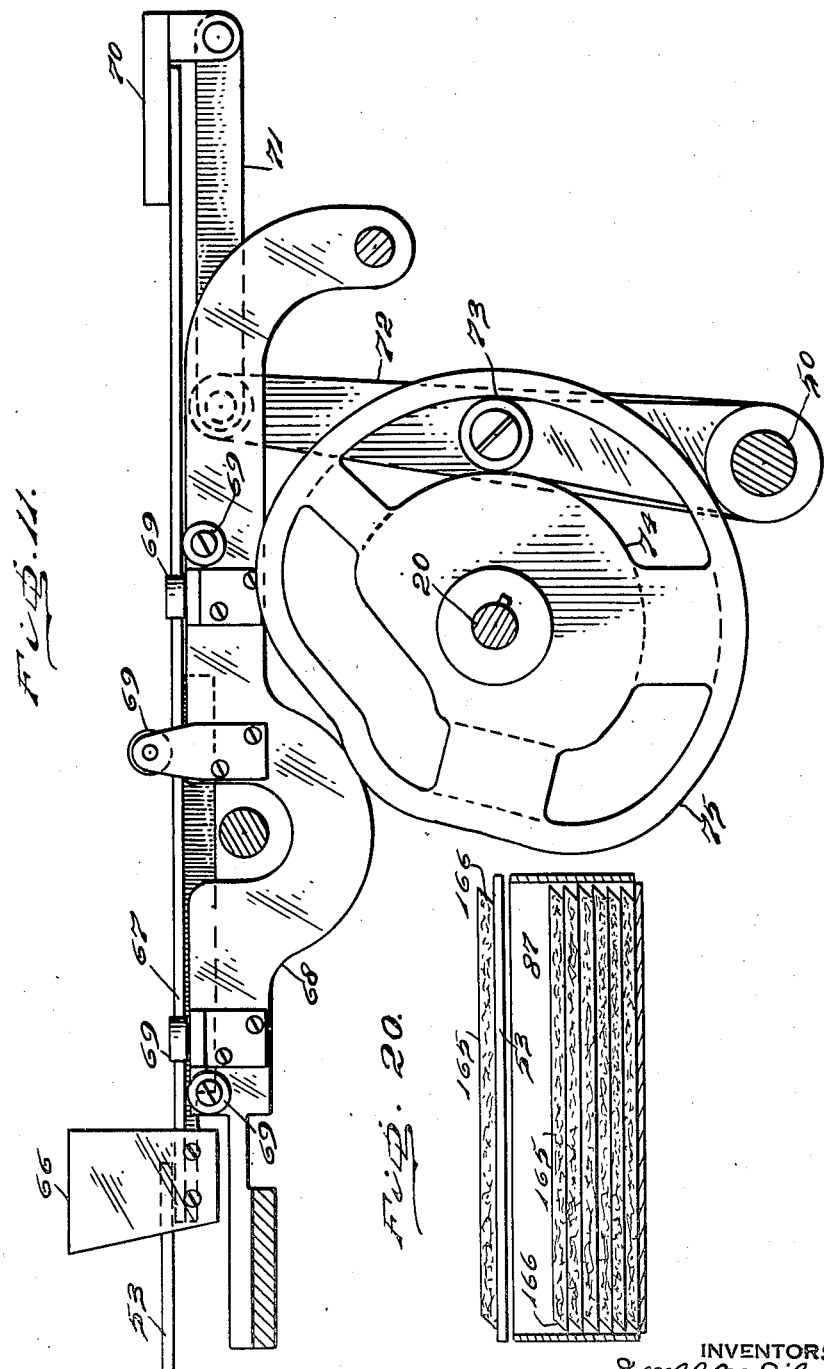

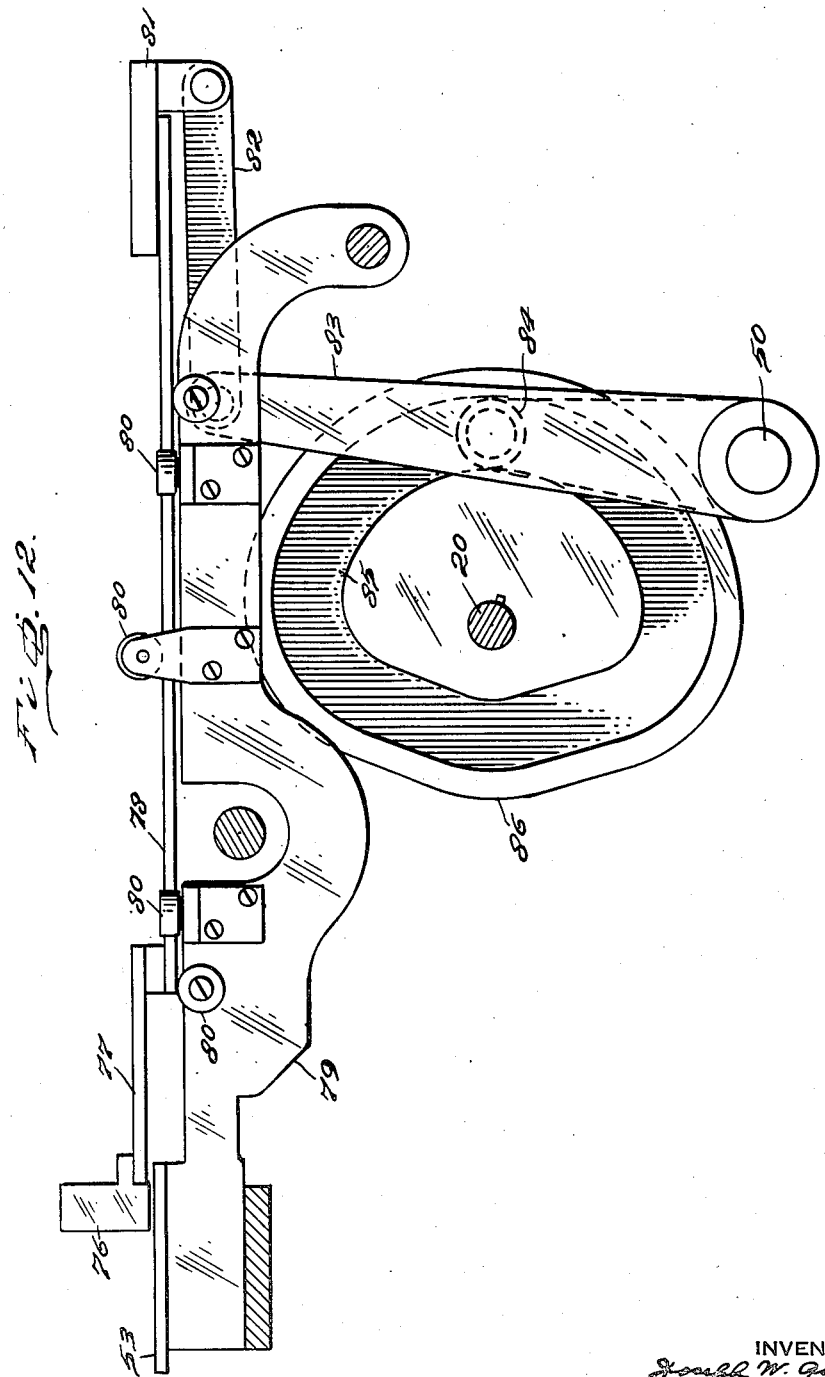

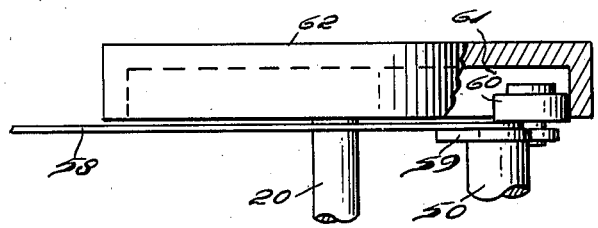
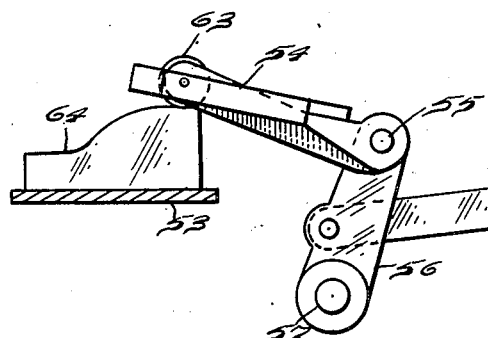
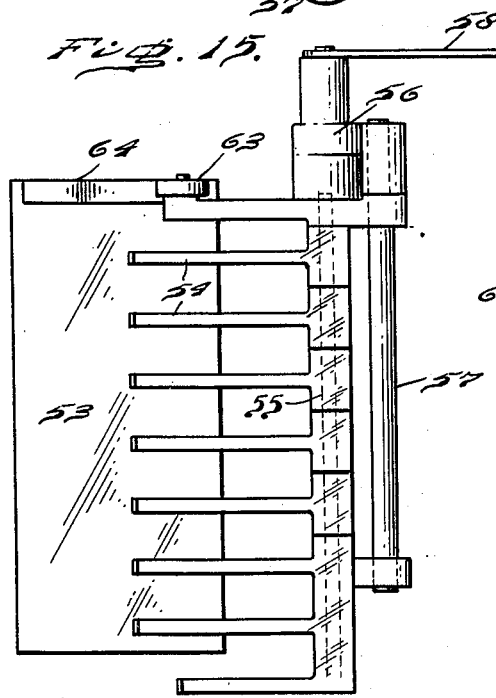
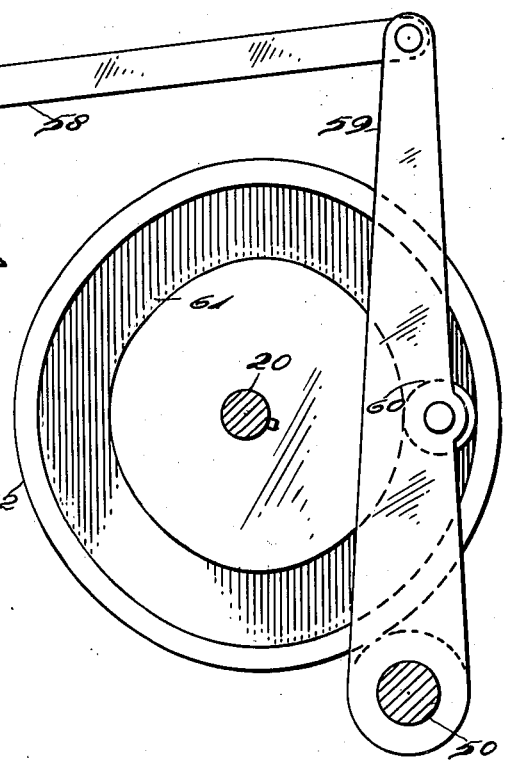

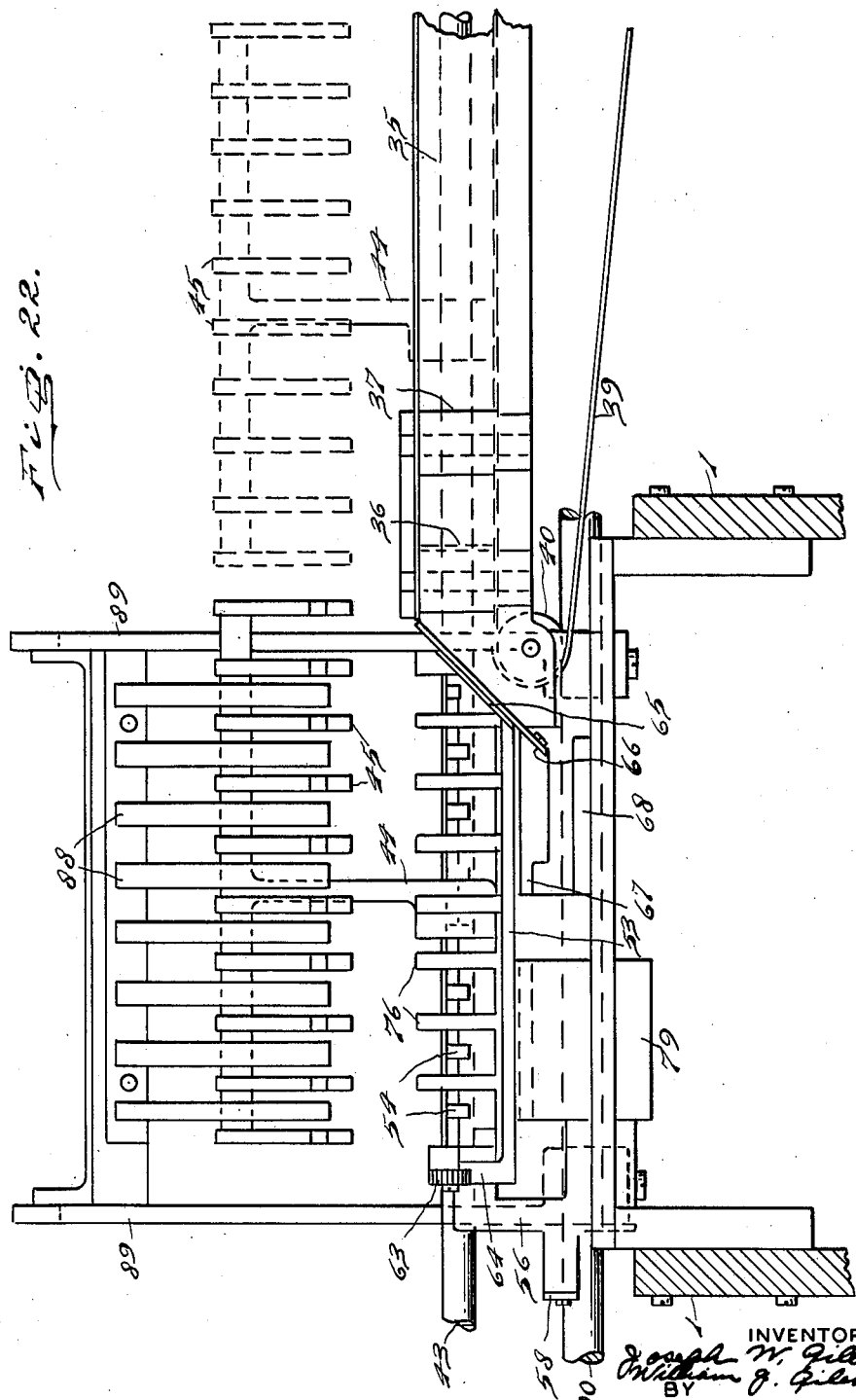

Patented May 30, 1944

2,350,225

UNITED STATES PATENT OFFICE 2,350,225

METHOD OF AND APPARATUS FOR MAKING BUNCHES

Joseph W. Giles and William J. Giles, Belleville, N. J., assignors to Jersey Cigar Machines, Inc., Belleville, N. J.

Application December 28, 1940, Serial No. 372,058

19 Claims. (Cl. 131—21)

The primary object of our invention is to devise a novel method of and apparatus for making cigar bunches, wherein the tobacco is confined in a novel manner during the building up of the bunch charge, so that, when delivered to the rolling apron for the application of the binder, it will be in the form of a sponge-like mass of desired density.

The tobacco is placed by the operator in the trough of a cross feed and is fed forwardly in a stream, the depth of which is less than that of a bunch charge. Novel rake mechanism removes from the stream of tobacco small quantities less than a bunch charge. Each small quantity is cut off to length while being held in place by novel pressure mechanism. Each small quantity is pushed forwardly to be received in a chamber in which it is pressed downwardly by novel sizing mechanism.

When the complete bunch charge has been built up, novel ejector mechanism moves the bunch charge into the pocket of a rolling apron to subject it to a conventional rolling operation for the application of the binder.

With the above and other objects in view as will hereinafter clearly appear, our invention comprehends a novel method of and apparatus for making cigar bunches.

It further comprehends novel filter feeding mechanism, novel pressure mechanism, novel cutting mechanism, novel pusher mechanism, novel sizing mechanism, novel ejecting mechanism, and novel means for occasioning the cyclical operations of said mechanisms in timed relation.

Other novel features of construction and advantage will hereinafter appear in the detailed description and the appended claims.

For the purpose of illustrating the invention, we have shown in the accompanying drawings a perferred embodiment of it, which, in practice, will give satisfactory and reliable results. It is, however, to be understood that this embodiment is typical only and the various instrumentalities of which our invention consists can be variously arranged and organized, and the invention is not limited to the exact arrangement and organization of these instrumentalities as herein set forth.

Figure 2 is a top plan view of a portion of the cigar bunching machine, certain of the parts being omitted.

Figure 3 is a front elevation of the machine, certain of the parts being omitted for the sake of clearness of illustration.

Figure 4 is a sectional elevation showing more particularly feeding, pressure, sizing and ejecting mechanisms.

Figure 5 is a sectional elevation, similar to Figure 4, but showing the moving parts in a different relation from that seen in Figure 4.

Figure 6 is a top plan view of the cross feed and certain of its adjuncts.

Figure 7 is a side elevation of the parts seen in Figure 6.

Figure 8 is a sectional elevation of driving means for the cross feed.

Figure 9 is a top plan view, showing more particularly cutting and pusher mechanism.

Figure 10 is a sectional elevation, showing a feed rake and its adjuncts.

Figure 11 is a sectional elevation of cutting mechanism and its operating means, the section being taken substantially on line 11—11 of Figure 9.

Figure 12 is a sectional elevation of a pusher and its operating means, the section being taken substantially on line 12—12 of Figure 9.

Figure 13 is a top plan view, partly broken away, of operating means for the pressure fingers.

Figure 14 is a sectional elevation, showing pressure fingers and their operating means.

Figure 15 is a top plan view of a portion of Figure 14.

Figure 18 is a perspective view of a portion of the sizing chamber and the yielding abutment.

Figure 19 is a perspective view of the plunger frame and plunger and certain of their adjuncts.

Figure 20 is a sectional view of the sizing box, showing the manner in which small cut quantities are built up into a bunch charge.

Figure 21 is a side elevation, on an enlarged scale, of crank mechanism seen in Figure 6.

Figure 22 is a section taken substantially on line 22—22 of Figure 5, with the ejecting plunger and a portion of the frame removed.

Similar numerals of reference indicate corresponding parts.

Figure 1:
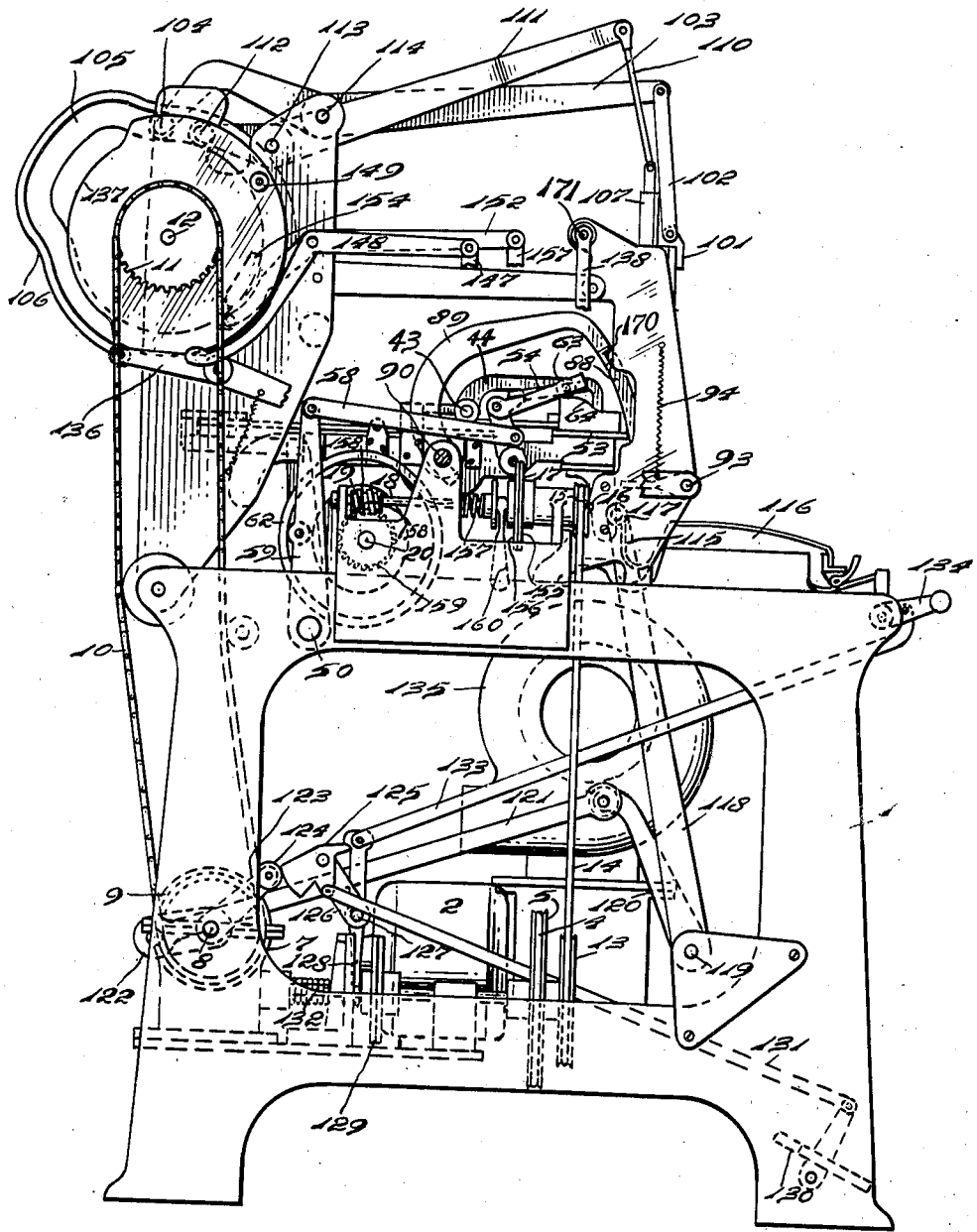
Figure 1 is a side elevation of a machine for making cigar bunches embodying our invention, and by the use of which our novel method can be carried out in practice.

Referring to the drawings:

In the detailed description of the construction and operation of the machine, we will, in so far as it is practical, describe the various mechanisms in the order in which they are set into operation by the driving mechanism.

The driving mechanism

The driving mechanism, see Figures 1, 2, and 3, is mounted on a main frame 1, the construction and arrangement of which may vary widely in practice. A motor 2 has fixed to its shaft a pulley 3, around which a belt 4 passes, said belt also passing around a pulley 5, on a shaft 6, journalled in the machine frame. The shaft 6, through speed reducing mechanism 7, of any desired type, drives a shaft 8. The shaft 8 has fixed to it a sprocket 9, around which a sprocket chain 10 passes, said sprocket chain also passing around a sprocket 11 on a shaft 12, journalled in the machine frame. The shaft 6 has a pulley 13, around which a belt 14 passes, said belt also passing around a pulley 15 on a shaft 16, journalled in the machine frame. The shaft 16 is connected by a clutch 17 with a shaft 18, which is intergeared at 19 with a shaft 20, journalled in the machine frame. The shaft 20, see Figure 6, is intergeared at 21 with a shaft 22, suitably journalled and provided with a crank 23.

The cross feed

The crank 23, see Figures 6 and 7, is connected by a link 24 with a lever 25 loosely mounted on a shaft 26 in a sub-frame 27, secured to the main frame and extending laterally from a side thereof. The lever 25 has at one end a pawl 28, retained by a spring 29 in driving engagement with a ratchet wheel 30, fixed to the shaft 26. The shaft 26 has spaced bevel gears 31 meshing with gears 32 fixed to their shafts 33, and having belt pulleys 34 to receive laterally spaced, endless belts 35 which pass around pulleys 36 and over idlers 37, see Figure 6. The shaft 26 has a belt pulley 38, around which an endless bottom belt 39 passes, said belt also passing over a support 177 around a pulley 40, see Figure 7.

One end of the lever 25, see Figures 6 and 7, is connected by a link 41, through a universal joint 42, with a rod 43, on which a feed rake 44 is fixed. The free end of the feed rake has spaced fingers 45, which engage, at certain times, the stream of tobacco being fed by the cross feed. The shaft 43, see Figure 10, has one end of an arm 46 fixed to it, the other end of said arm having a plate 47 slidable between anti-friction devices 48, see also Figure 8, on a cam lever 49, loosely mounted on a rod 50, secured to the main frame. The cam lever 49 has a roller 51 which rides on a cam 52, fixed to the shaft 20.

It will thus be clear that the feed rake is down while the belts are moving to hold the tobacco in place and to intermittently move the tobacco forwardly as it leaves the belts to be received on a plate 53. In order to retain the tobacco on the plate 53, pressure fingers 54 now come into operation.

Pressure fingers and their operating means

The pressure fingers 54, see Figures 14 and 15, are in the form of spaced fingers, rectangular in cross section and loosely mounted on a rod 55, fixed to a lever 56, fulcrumed on a stud shaft 57 on the frame 1. The lever 56 is pivotally connected with a link 58, pivotally connected with a cam lever 59, mounted on the rod 50. The cam lever 59 has a roller 60, see also Figure 13, which travels in a cam groove 61 of a cam 62, fixed to the shaft 20.

The pressure fingers 54 have a roller 63, which rides on a cam 64 secured to the plate 53. This cam 64 permits the fingers 54 to move downwardly, see Figure 5, into contact with the small quantity of tobacco on the plate 53 to hold it in place during the cutting operation.

The cutting operation

A stationary knife 65, see Figure 7, is fixed in any desired manner to the frame and cooperates with a movable knife 66, see Figures 9 and 11, to cut off to length each small quantity of tobacco on the plate 53. The movable knife is angularly disposed at and fixed to the front end of a bar or slide 67, slidably mounted on a support 68 forming a part of the machine frame. The knife 66 slides under the knife 65 with a shearing action and either of the knives may have a cutting edge. The bar is guided by anti-friction rollers 69. The slide 67 has an angle bracket 70 fixed to its rear end. A link 71 pivotally connected with the bracket is pivotally connected to a cam lever 72, loosely mounted on the shaft 50, and having a roller 73 which travels in a cam groove 74 of a cam 75, fixed to the shaft 20.

Pusher mechanism

Each small quantity of tobacco after it is cut off is pushed from the plate 53, see Figures 9 and 12, by a pusher 76 in rake form or having spaced fingers. The pusher 76 is fixed to a plate 77 which is part of a slide 78, slidable on a support 79, which is a part of the main frame. The bar 78 is guided by anti-friction devices 80. An angle bracket 81 is fixed to the rear end of the bar 78, and is connected by a link 82 with a cam lever 83, fulcrumed on the rod 50. The lever 83 has a roller 84 which travels in a cam groove 85 of a cam 86, fixed to the shaft 20.

Each small quantity of tobacco on the plate 53 after it is cut off is pushed forwardly while the pressure fingers are in contact with the tobacco, into a chamber 87 in which the bunch charge is built up, each small quantity being separably sized.

Sizing mechanism

A sizing plunger 88, of rake formation, having spaced fingers, see Figures 1, 2, 4 and 5, is carried by a cross bar 170 fixed to arms 89, fixed to a rock shaft 90, journalled in the machine frame. The shaft 90 has fixed to it an arm 91, see Figure 16, pivoted to an adjustable link 163, pivotally connected with a crank arm 164, fixed to the shaft 20.

The sizing plunger is operated to size each small quantity of tobacco as it is deposited in the chamber 87. The sizing chamber 87 is formed by walls 173, and 174 and walls 175 and 176, see Figure 19. The bottom of the sizing chamber 87 is closed by a yielding abutment 92, fixed to a rock shaft 93, see Figures 4 and 5, and retained in raised position by a spring 94. The rock shaft 93 has an arm 95 fixed to it, see Figures 1, 16 and 17, and has a roller 96 which rests on a lever 97 pivoted on a stud 98. The lever 97 is held upwardly by a spring 99, which places an extra tension against the sizing fingers as the bunch charge is being built up to contribute to the obtaining the proper density of the bunch charge.

The wall 173 of the sizing chamber 87 is connected with a movable frame 100, having rollers 178, see Figures 4 and 5, slidable in side frame members connected by tie rods 171 and 172. The frame 100 has a bracket 101 connected by a link 102, see Figures 1 and 5, to a cam lever 103 having a roller 104 in a cam track 105 of a cam 106, fixed to the shaft 12.

Ejecting plunger and its operating means

An ejecting plunger 107 is guided in guides 108 and 109 secured to walls of the chamber 87, see also Figure 9. The plunger 107 is connected by a link 110, see Figure 1, with a cam lever 111 having a roller 112 in the cam groove 105 of the cam 106. The lever 103 is fulcrumed at 113 and the lever 111 is fulcrumed at 114 on the machine frame.

Rolling mechanism

The rolling mechanism for applying a binder to the bunch charge is substantially conventional. 115 is the rolling apron and 116 is the rolling table. The roll 117 is carried by the arms 118 fixed to a rock shaft 119. A rock arm 120, fixed to shaft 119, is connected by a link 121 with a crank 122, fixed to the shaft 8.

Trip mechanism

An arm 123 fixed to the shaft 8, see Figure 1, has a roller 124 which contacts a trip member 125 loosely mounted on an arm 126 secured to a shaft 127 having a shifting fork 128 to disengage the clutch 129. A foot pedal 130 is connected by a link 131 with the trip member 125 to rock it upwardly out of the path of the roller 124, allowing the spring 132 to cause the reengagement of the clutch and thereby start the machine in operation.

The shifting fork 128 is provided with an emergency tripping device, being connected by a link 133 with a pivotally mounted handle 134.

A motor driven suction blower 135, see Figures 1 and 3, leads to the suction table in the conventional manner to hold the binder in place during the rolling operation.

A tension cam lever 167 rides on a cam 168, fixed to a shaft 169 to control the rolling apron in a conventional manner, see Figure 5.

Feed tripping mechanism

Figure 16:
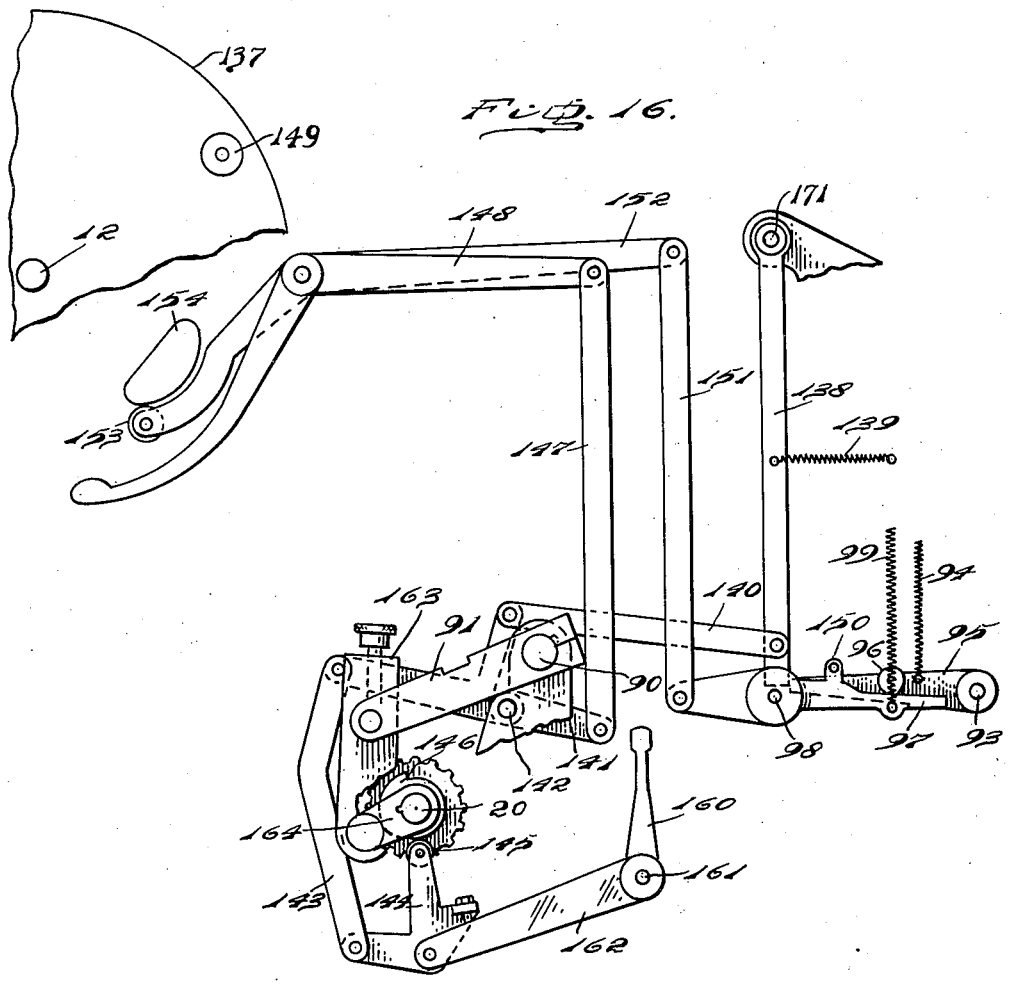
Figure 16 is a detailed view of controlling mechanism.
Figure 17:
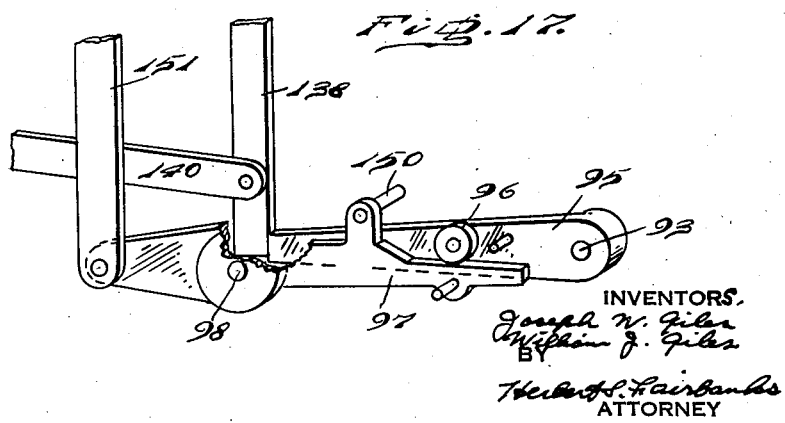
Figure 17 is a perspective view, on an enlarged scale of a portion of Figure 16.

When the sizing plunger exerts sufficient pressure on the yielding abutment 92, it moves the arm 95 downwardly out of the path of a pivoted stop arm 138, see Figures 16 and 17, which then moves inwardly due to a spring 139. The arm 138 is connected by a link 140 with a three arm lever 141, pivoted at 142. The lever 141 is connected by a link 143 with a bell crank lever 144, on which is mounted a roller 145 which moves into the path of a cam 146, fixed on the shaft 20. The lever 141 is connected by a link 147, see Figure 16, with a lever 148, suitably fulcrumed, and in the path of a roller 149 on the cam 137. The lever 97 has a pin 150 disposed above the arm 95 to move the latter downwardly and trip stop arm 138 to stop the feed in case no tobacco is in the sizing chamber. The lever 97 is connected by a link 151 with a cam lever 152 having a roller 153, riding on a cam 154, fixed to the cam 137.

Feed drive unit

The shaft 16 has a clutch disc 155 and a cooperating movable disc 156 is on the shaft 18, see Figures 1 and 2. The discs are retained in clutched engagement by a spring 157. The shaft 18 has a worm 158, meshing with a worm wheel 159, fixed to the shaft 20. The movable disc 156 is operated by a clutch fork 160 on a shaft 161. An arm 162, fixed to the shaft 161, has pivotally mounted on it the lever 144.

In Figure 20, we have illustrated the shape of a small quantity of tobacco 165 on the plate 53, with inclined end walls 166 formed by the angularly disposed movable knife. These end walls, when the bunch charge is built up, are zigzag or irregular in contour.

The operation of the machine

Having the machine in a state of rest and tobacco in the trough of the cross feed between the side belts 35 and on the bottom belt 39, with the depth of the stream less than that of a bunch charge, the machine is ready to start.

In stopped position, the sizing chamber 87 and the ejecting plunger 107 are in their downward position in the pocket of the apron 115. At this time, the lower clutch 129 and the upper clutch 17 are disengaged, and the pulleys 13, 5, and 15 are running continuously, with the rest of the machine idle. The operator presses on the footpedal 130, moving link 131 to raise the trip member 125 out of the path of the roller 124, permitting the spring 132 to cause engagement of the clutch 129, thereby driving shaft 8, sprocket wheel 9, chain 10, sprocket wheel 11 and shaft 12, to thereby revolve cams 137 and 106. As cam 106 revolves, the roller 104 on lever 103, and roller 112 and lever 111 will raise the sizing chamber 87 and the ejecting plunger 107 out of the pocket of the rolling apron. The abutment 92 swings upwardly to close the bottom of the sizing chamber 87.

When the plunger 107 reaches its upward position, the roller 149 on the cam 137 will contact the lever 148, operating the lever 141 through the link 147, to move the link 143 downwardly and move roller 145 on lever 144 out of the path of the cam 146. At the same time, lever 141, see Figure 16, through link 140, will move stop arm 138 from above arm 95, and allow the arm 95 to move upwardly, due to the tension of the spring 94, the arm 95 holding the arm 138 in the position seen in Figure 16, thereby causing roller 145 to remain out of contact with the cam 146, allowing the spring 157 to move clutch disc 156 into clutched engagement with the disc 155, thus driving the shaft 20.

During this operation, the cam 154 passes beyond the roller 153, allowing the lever 97 to move upwardly, through the tension of the spring 99.

The shaft 20, see Figure 6, drives the shaft 22 actuating the crank 23, and the link 24 rocks the lever 25 and actuates the pawl 28 to drive the ratchet wheel 30, and thereby the bottom belt 39 and side belts 35.

The tobacco is placed in the feed trough and intermittently advanced by the belts, in stream form. Link 41 connected to lever 25, through joint 42 and rod 43, causes the feed rake 44 to move forwardly in unison with the movement of the belts. At this time, the feed rake 44 is in contact with the stream of tobacco, due to the timed operation of the cam 52. As the belts and the feed rake complete their stroke in feeding a small quantity of tobacco, the cam 62 moves pressure fingers 54 forwardly and due to cam 64, the pressure fingers rock downwardly, holding the tobacco in place on the plate 53 during the time that the feed rake 44 is moving upwardly.

The knife 66 now moves forwardly towards the stationary knife to cut the tobacco to length while being held in place by the pressure fingers. The forward movement of the movable knife is caused by the cam 75, see Figure 11. After the knife has moved a short distance, the pusher 76 is advanced by the cam 86 to push the tobacco off of the plate 53 to be received in the upper end of the sizing chamber 87. During this operation, the pressure fingers are down and the pusher fingers pass between the fingers of the pressure member. At this time, while the cam 86 is holding the pusher 76 in its forward position and the tobacco is at the upper end of the sizing chamber, the sizing fingers 88 are moved downwardly by arms 89, shaft 90, arm 91, link 92 and crank 93. This forces the tobacco into the sizing chamber 87. The full stroke of the plunger 88 is a predetermined distance above the yielding abutment 92, in accordance with the size of the bunch charge to be made.

We have now described the feed of one small quantity, and the cycle just described is repeated until a complete bunch charge has been built up in the sizing chamber. When the sizing plunger presses on top of a complete bunch charge in chamber 87 with sufficient force to overcome the resistance of the spring 99, the yielding abutment swings downwardly, see Figure 5, carrying with it the arm 95, allowing the stop arm 138, see Figure 16, to move forwardly, thereby moving the roller 145 in to the path of the cam 146. As the rise of cam 146 rotates, it pushes the lever 162 downwardly, thereby releasing the movable clutch disc 156 and stopping the feed of tobacco.

It is to be understood that a sufficient quantity of tobacco is placed in the feed trough to make a bunch charge before the machine has completed one cycle. Should, however, the operator fail to supply sufficient tobacco, the feed will automatically stop before the machine completes its cycle to prevent contacting of the sizing and ejecting plungers.

This is accomplished by the cam 154, see Figure 1, contacting the roller 153 to rock the lever 152 and cause the pin 150 on the lever 97 to move downwardly the arm 95 and release the stop member 138, see also Figures 16 and 17.

The chamber 87 containing the bunch charge is moved downwardly by the link 102, the lever 103, and the cam 106 into the pocket of the rolling apron, pushing abutment 92 out of its path.

The ejector plunger 107 follows the chamber 87 downwardly, due to the action of the lever 11 and the cam 106, pushing the tobacco out of the chamber 87 into the pocket of the rolling apron. At this time, the roller 124 on the arm 123, contacts the trip member 125, releasing the clutch and stopping the machine.

The apron roller 117 is operated when the machine starts, and the ejecting plunger 107 and the chamber 87 are in their upward position, and returns to its rearward position before the chamber 87 descends.

The application of the binder to the bunch charge in the rolling operation is conventional, and a detailed description thereof is therefore believed to be unnecessary.

We are aware that it has heretofore been proposed in Patent No. 1,075,189, to provide a charge receiving chamber with a yielding abutment which moves out of the path of the tobacco as the latter is discharged, and we therefore make no claims broadly to such feature.

Heretofore it has been proposed in machines for making long filler cigars from an endless stream of tobacco, to cut off a mass from the stream in a quantity greater than that necessary for one cigar. This mass was cut with a zigzag or irregular cut. When this charge was pushed forward into a measuring chamber to be cut off to size, the measured size might contain only one or several zigzag cuts, thereby making each end of the cigar too small or too large.

Tobacco built up in this manner must have considerable pressure exerted above it before it leaves the feed belt in order to feed it from the belt. This pressure compacts the tobacco so tight that it prevents the making of a free drawing cigar.

Our present invention is built around the fundamental idea of feeding a small quantity at a time, cutting each small quantity at an angle and superimposing these small quantities one above the other as the bunch charge is built up to form zigzag or irregular end walls, so that each end portion will have a desired taper and a predetermined amount of tobacco in the finished cigar. It will be clear from Figure 20 how this is accomplished. The inclined end walls 166 of the layers 165 when assembled in superimposed relation form a serrated edge at each end with the reentrant free points in substantially one vertical plane.

The end portions of the different bunch charges will have at an end the same amount of tobacco, and when the binders are applied the bunches will be uniform in shape, and size, and uniform in the amount of tobacco which each bunch contains.

Having thus described our invention, what we claim as new and desire to secure by Letters Patent is:

1. The method of making a cigar bunch, which consists in feeding long filler tobacco in stream form, with the depth of the stream less than that of a bunch charge to be formed, removing tobacco from the stream in small quantities less than a bunch charge, cutting each small quantity to a desired length transversely of the line of feed to form quantities of substantially uniform lengths, assembling such small cut quantities one above the other until a complete bunch charge has been built up, stopping the feed as soon as a single, complete bunch charge has been built up, pressing each of said small quantities downwardly as the bunch charge is being built up, and applying a binder to the bunch charge.

2. The method of making a cigar bunch, which consists in forming a travelling stream of tobacco of less depth than that of a bunch charge, removing tobacco from the stream in small quantities less than a bunch charge, cutting each small quantity as it is removed to substantially the same length, assembling such small quantities one above the other until a complete bunch charge has been built up, pressing each small quantity downwardly as the bunch charge is built up, retaining each small quantity of the tobacco during bunch charge formation in position by pressure exerted at spaced intervals along its length, stopping the feed as soon as a single, complete bunch charge has been built up, and applying a binder to the bunch charge.

3. In a cigar bunching machine, a plate, means to intermittently feed small quantities of tobacco on to said plate, pressure fingers to retain each small quantity of the tobacco in position on said plate, means to cut to length each small quantity while retained on the plate by the pressure fingers, a sizing chamber, having an inlet and an outlet, a yielding abutment for the outlet from said chamber, means to push each small quantity of tobacco off of said plate to be received in said chamber to build up a bunch charge, fingers to press each small quantity of tobacco downwardly as it is received in said chamber, stopping the feed as soon as a single, complete bunch charge has been built up, and means to eject a complete bunch charge from said chamber.

4. In a cigar bunching machine, a plate, means to intermittently feed small quantities of tobacco on to said plate, spaced pressure fingers to retain each small quantity of the tobacco in position on said plate, means to cut to length each small quantity while retained on the plate by the pressure fingers, a sizing chamber, having an inlet and an outlet, a yielding abutment for the outlet from said chamber, means passing between said pressure fingers to push each small quantity of tobacco off of said plate to be received in said chamber to build up a bunch charge, fingers to press each small quantity of tobacco downwardly as it is received in said chamber, stopping the feed as soon as a single, complete bunch charge has been built up, and means to eject a complete bunch charge from said chamber.

5. In a cigar bunching machine, a plate, means to intermittently feed small quantities of tobacco on to said plate, reciprocatory pressure fingers to retain each small quantity of the tobacco in position on said plate, a cam to move the pressure fingers into and out of contact with the tobacco on said plate during their reciprocatory movement, means to cut to length each small quantity while retained on the plate by the pressure fingers, a sizing chamber, having an inlet and an outlet, a yielding abutment for the outlet from said chamber, means to push each small quantity of tobacco off of said plate to be received in said chamber to build up a bunch charge, fingers to press each small quantity of tobacco downwardly as it is received in said chamber, means to stop the feed as soon as a single, complete bunch charge has been built up, and means to eject a complete bunch charge from said chamber.

6. In a cigar bunching machine, a plate, means to intermittently feed small quantities of tobacco on to said plate, pressure fingers to retain the tobacco in position on said plate, means to cut to length each small quantity while retained on the plate by the pressure fingers, a sizing chamber, having an inlet and an outlet, a yielding abutment for the outlet from said chamber, means to push each small quantity of tobacco off of said plate to be received in said chamber to build up a bunch charge, fingers to press each small quantity of tobacco towards the chamber outlet as it is received in said chamber, means to eject a complete bunch charge from said chamber, and means to automatically stop the feed in case after the feed has started sufficient tobacco for a bunch charge is not received in the sizing chamber.

7. In a cigar bunching machine, side belts and a bottom belt contributing to form a filler receiving feed trough, means to intermittently advance said belts, a feed rake reciprocated by said means, and means to lower said feed rake in timed relation with its advance movement to cause the rake to press against the tobacco on the bottom belt, and to move the rake in synchronism with the movement of the bottom belt beyond the discharge end of the belts to advance the tobacco beyond the discharge ends of said belts.

8. In a cigar bunching machine, a cross feed, means to intermittently actuate said cross feed, a feed rake reciprocated by said means, means to move the feed rake into and out of contact with the tobacco being fed and while in contact with the tobacco move it in synchronism with the movement of the belt beyond the discharge end of the belt, to intermittently remove small quantities from the cross feed, reciprocatory pressure fingers, a cam to move said fingers into and out of contact with each small quantity of tobacco fed by the feed rake, means to cut each small quantity to length, sizing means, means to feed each small quantity while being held down by the pressure fingers to the sizing means to build up a bunch charge from such small quantities, and means to eject a complete bunch charge from the sizing means.

9. In a cigar bunching machine, a plate, means to intermittently feed filler tobacco in small quantities on to said plate, pressure fingers, a stationary cam to lower said fingers into and raise them out of engagement with each small quantity of tobacco on said plate, means to cut the tobacco to length, a reciprocatory slide, a pusher carried by said slide and having spaced fingers to pass between the pressure fingers to push each small quantity of tobacco off of said plate, a sizing chamber into which charge portions of tobacco are received from said plate until a bunch charge is built up, means to press each small quantity of tobacco into the sizing chamber after it is fed thereto, and means to eject a complete bunch charge from the sizing chamber.

10. In a cigar bunching machine, mechanism to feed tobacco in a stream of less depth than that of a bunch charge, mechanism to separate tobacco from said stream in small quantities less than that of a bunch charge and assemble such small quantities one above the other until a complete bunch charge has been built up, a chamber in which the bunch charge is built up, fingers movable to press each small quantity into the chamber as each small quantity is fed to the chamber, means to stop the feed as soon as a single, complete bunch charge has been built up, mechanism to remove each bunch charge as it is completed, mechanism to apply a binder to the bunch charge, and means to occasion the cyclical operation of said mechanisms.

11. In a cigar bunching machine, a cross feed, means to intermittently drive it, a rock shaft, a feed rake fixed to said rock shaft and reciprocated by said means, a plate fixed to said rake, a cam lever in which said plate is slidable, a cam to actuate said cam lever and means to actuate said cam to cause said cam lever to rock said rock shaft and thereby said feed rake to move the latter into and out of contact with the tobacco fed by said cross feed.

12. In a bunch making machine, mechanism to feed filler tobacco in a stream of less depth than that of a bunch charge, mechanism to separate a small quantity less than a bunch charge from said stream, pressure mechanism having spaced fingers to hold down each small quantity fed, mechanism to cut each small quantity to length, a sizing chamber, pusher mechanism having spaced fingers to pass between the pressure fingers while they are holding down a small quantity to move such small quantity to the sizing chamber, fingers movable into said chamber to press each small quantity into said chamber as a bunch charge is built up, mechanism to eject the bunch charge from the sizing chamber, binder applying mechanism, and means to occasion the cyclical operation of said mechanisms.

13. In a bunch making machine, a plate to support tobacco, means to feed small quantities one at a time on said plate, pressure fingers, a lever pivotally carrying said fingers, cam means to rock said lever, including a roller mounted on said fingers, and including a stationary cam cooperating with said roller to permit the pressure fingers to rock downwardly to contact the tobacco on said plate.

14. In a bunch making machine, a frame having elongated supports, a plate at the forward ends of said supports, a reciprocatory, open ended sizing chamber in front of said plate, means to intermittently feed tobacco less than a bunch charge on to said plate, pressure fingers to hold the tobacco on said plate, a stationary knife, a reciprocatory knife-carrying slide on one of said supports to cut the tobacco to length, a reciprocatory pusher carrying slide on the other of said supports to push tobacco off said plate to drop into said sizing chamber, a yielding abutment closing the bottom of said sizing chamber, a sizing plunger movable into the sizing chamber, and an ejecting plunger to eject a bunch charge from said sizing chamber when a complete bunch charge has been built up therein.

15. In a cigar bunch making machine, a frame having elongated supports, a plate at the forward end of said supports, a reciprocatory open ended sizing chamber at the discharge end of said plate, means to intermittently feed small quantities of tobacco less than a bunch charge on to said plate, pressure fingers to hold tobacco on said plate, a reciprocatory knife-carrying slide on one of said supports, a reciprocatory pusher carrying slide on the other of said supports and having fingers to pass between the pressure fingers to push tobacco off the plate to be received in the sizing chamber, a plunger movable into the sizing chamber each time tobacco is received therein, a yielding abutment exterior of and controlling discharge from said sizing chamber, and means to eject a bunch charge from said sizing chamber.

16. In a cigar bunching machine, means to feed tobacco in a stream, means to cut from the stream a small quantity less than a bunch charge, a reciprocatory sizing chamber, means to feed said small quantities one at a time into said sizing chamber to be disposed in layers one above the other to form a bunch charge, a yielding abutment exterior of and closing the delivery end of said sizing chamber, means to eject the bunch charge and move said abutment to open position, and means controlled by the movement of the abutment to stop the feed.

17. In a cigar bunching machine, means to feed long filler tobacco in stream form, means to cut off from the stream with an acute angle cut transversely of the stream a small quantity less than a bunch charge, means to assemble the small quantities in superimposed relation to form a bunch charge with serrated end walls in vertical alignment, and means to apply a binder to the bunch charge.

18. The method of making cigar bunches, which consists in feeding long filler tobacco in stream form, cutting the stream transversely at an angle to the line of feed to form a small quantity with inclined end walls and with each small quantity of substantially uniform length, superimposing the small cut quantities one above the other to form a bunch charge with a serrated edge at each end with the reentrant free points in substantially one vertical plane and applying a binder to the bunch charge.

19. The method of making cigar bunches, which consists in feeding long filler tobacco in stream form, cutting off from the stream small quantities of tobacco of uniform lengths, the cuts being in a plane inclined to a plane perpendicular to the line of feed, assembling the quantities in superimposed relationship with the ends in vertical alignment to form a bunch charge, and applying a binder to the bunch charge.

JOSEPH W. GILES.
WILLIAM J. GILES.